(12) United States Patent
Hendrix et al.

(10) Patent No.: US 9,997,825 B2
(45) Date of Patent: *Jun. 12, 2018

(54) MODULAR SMALL CELL ARCHITECTURE

(71) Applicant: CommScope Technologies LLC, Hickory, NC (US)

(72) Inventors: Walter Mark Hendrix, Richardson, TX (US); Robert G. Slorach, Kilmarnack (GB); Michael D. Fabbri, Des Plaines, IL (US)

(73) Assignee: CommScope Technologies LLC, Hickory, NC (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/216,019

(22) Filed: Jul. 21, 2016

(65) Prior Publication Data

US 2016/0329633 A1   Nov. 10, 2016

Related U.S. Application Data

(63) Continuation of application No. 14/316,424, filed on Jun. 26, 2014, now Pat. No. 9,433,034.

(Continued)

(51) Int. Cl.
| | |
|---|---|
| *H04M 1/00* | (2006.01) |
| *H01Q 1/24* | (2006.01) |
| *H04B 1/40* | (2015.01) |
| *H04W 88/08* | (2009.01) |
| *H01Q 1/02* | (2006.01) |
| *H01Q 1/12* | (2006.01) |

(Continued)

(52) U.S. Cl.
CPC .............. *H01Q 1/246* (2013.01); *H01Q 1/02* (2013.01); *H01Q 1/1242* (2013.01); *H01Q 1/36* (2013.01); *H01Q 1/42* (2013.01); *H04B 1/40* (2013.01); *H04W 88/08* (2013.01)

(58) Field of Classification Search
CPC ......... H01Q 1/246; H01Q 1/02; H01Q 1/1242
USPC ...................................... 455/562.1
See application file for complete search history.

(56) References Cited

U.S. PATENT DOCUMENTS 5,757,324 A * 5/1998 Helms ...................... H01Q 1/42
                                                              343/700 MS
5,995,063 A * 11/1999 Somoza ................. H01Q 1/246
                                                              343/874

(Continued)

FOREIGN PATENT DOCUMENTS

| EP | 2113963 | 5/2008 |
|---|---|---|
| EP | 2784876 | 10/2014 |

(Continued)

OTHER PUBLICATIONS

International Search Report and Written Opinion for PCT/US2014/044428 dated Nov. 19, 2014 (10 pages).

(Continued)

*Primary Examiner* — Ajibola Akinyemi
(74) *Attorney, Agent, or Firm* — Myers Bigel, P.A.

(57) ABSTRACT

A wireless communication system is provided. The system includes a common module, is shaped as a sector of a cylinder and has a power supply. A sector radio module is coupled to the power supply and includes an access radio and an access antenna. The access antenna is configured to serve a sector of not more than 180°, and is also shaped as a sector of a cylinder.

17 Claims, 10 Drawing Sheets

Related U.S. Application Data

(60) Provisional application No. 61/866,764, filed on Aug. 16, 2013.

(51) Int. Cl.
    *H01Q 1/36*     (2006.01)
    *H01Q 1/42*     (2006.01)

(56) References Cited

U.S. PATENT DOCUMENTS

| | | | | |
|---|---|---|---|---|
| 8,593,370 | B2* | 11/2013 | Caldwell | H01Q 1/1242 343/879 |
| 9,209,523 | B2* | 12/2015 | Ma | H04W 84/042 |
| 2004/0174317 | A1* | 9/2004 | Dearnley | H01Q 1/1207 343/890 |
| 2007/0001919 | A1 | 1/2007 | Carroll et al. | |
| 2011/0032158 | A1 | 2/2011 | Rodger et al. | |
| 2014/0240194 | A1* | 8/2014 | Trojer | H01Q 1/007 343/879 |
| 2015/0017937 | A1* | 1/2015 | Colapietro | H01Q 1/02 455/128 |

FOREIGN PATENT DOCUMENTS

| | | |
|---|---|---|
| WO | WO 2009/156612 | 12/2009 |
| WO | WO 2010/104246 | 9/2010 |
| WO | WO 2012/105881 | 8/2012 |
| WO | WO 2013/044847 | 4/2013 |
| WO | WO 2013/086995 | 6/2013 |

OTHER PUBLICATIONS

International Preliminary Report on Patentability for PCT/US2014/044428 dated Feb. 25, 2016, (7 pages).

* cited by examiner

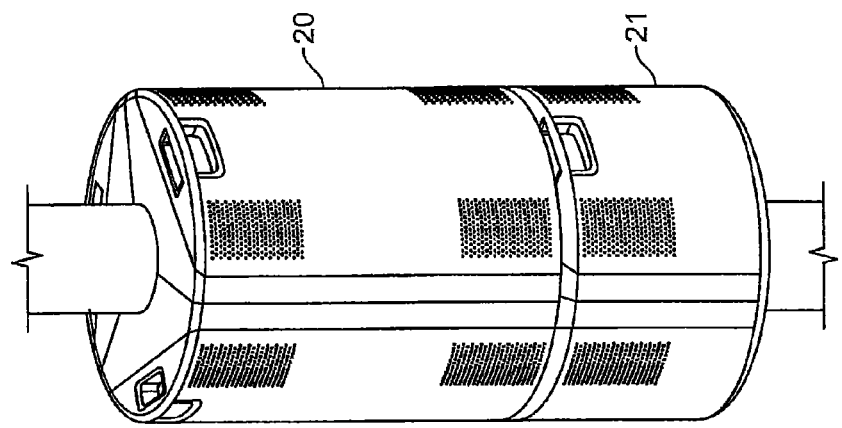
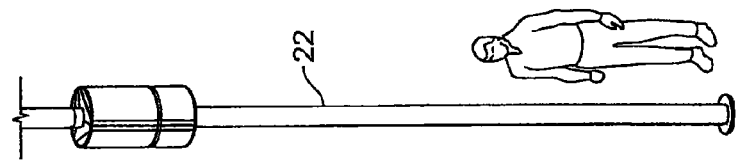

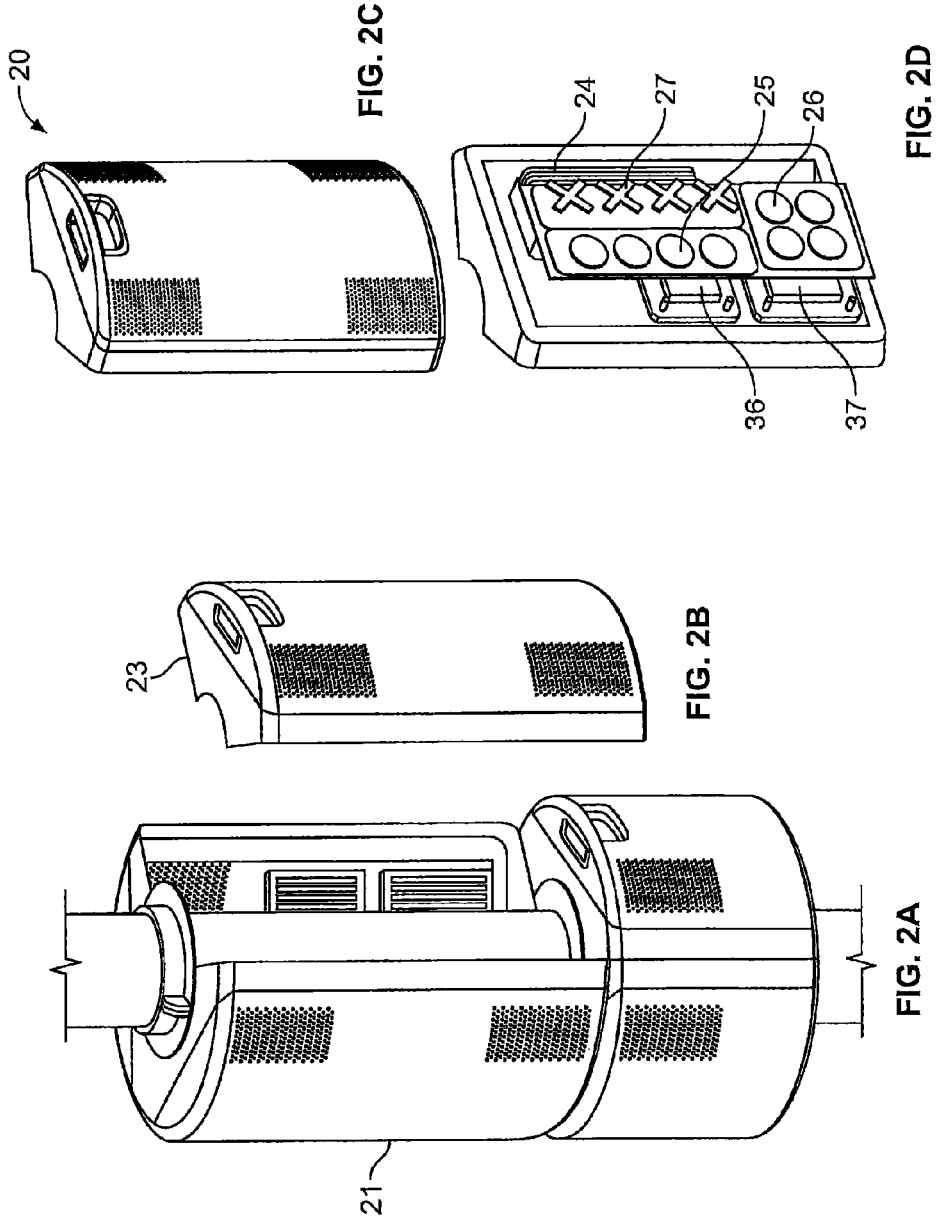

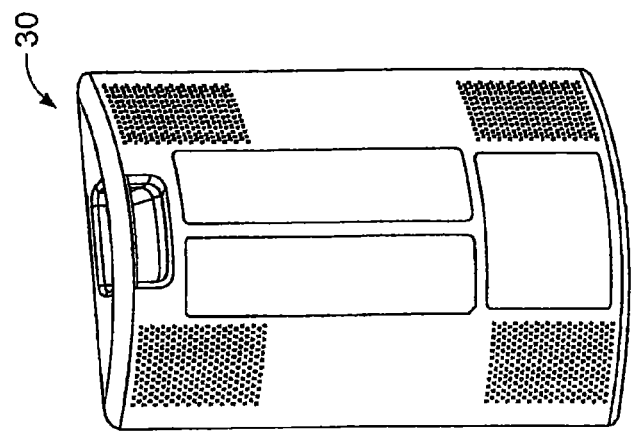
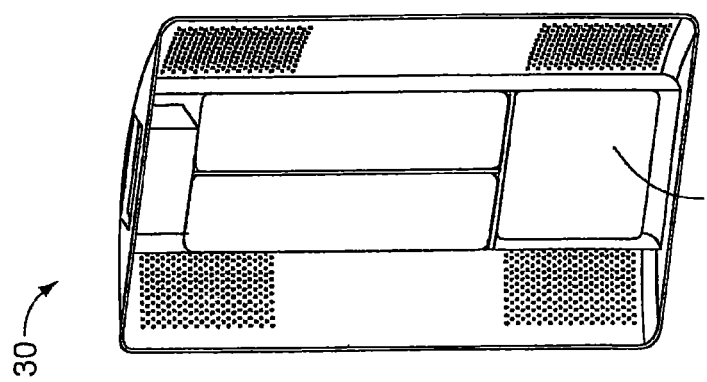
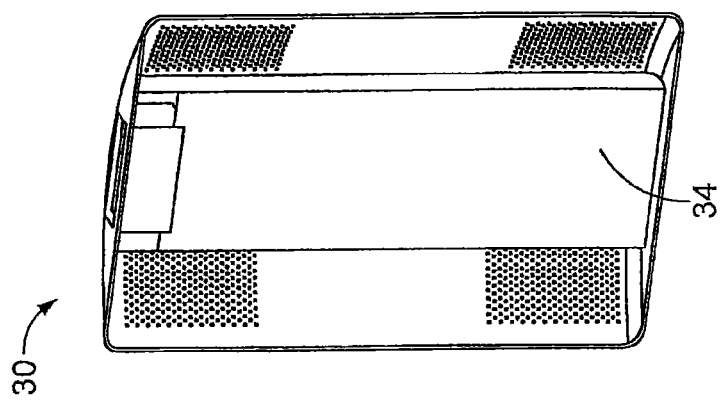

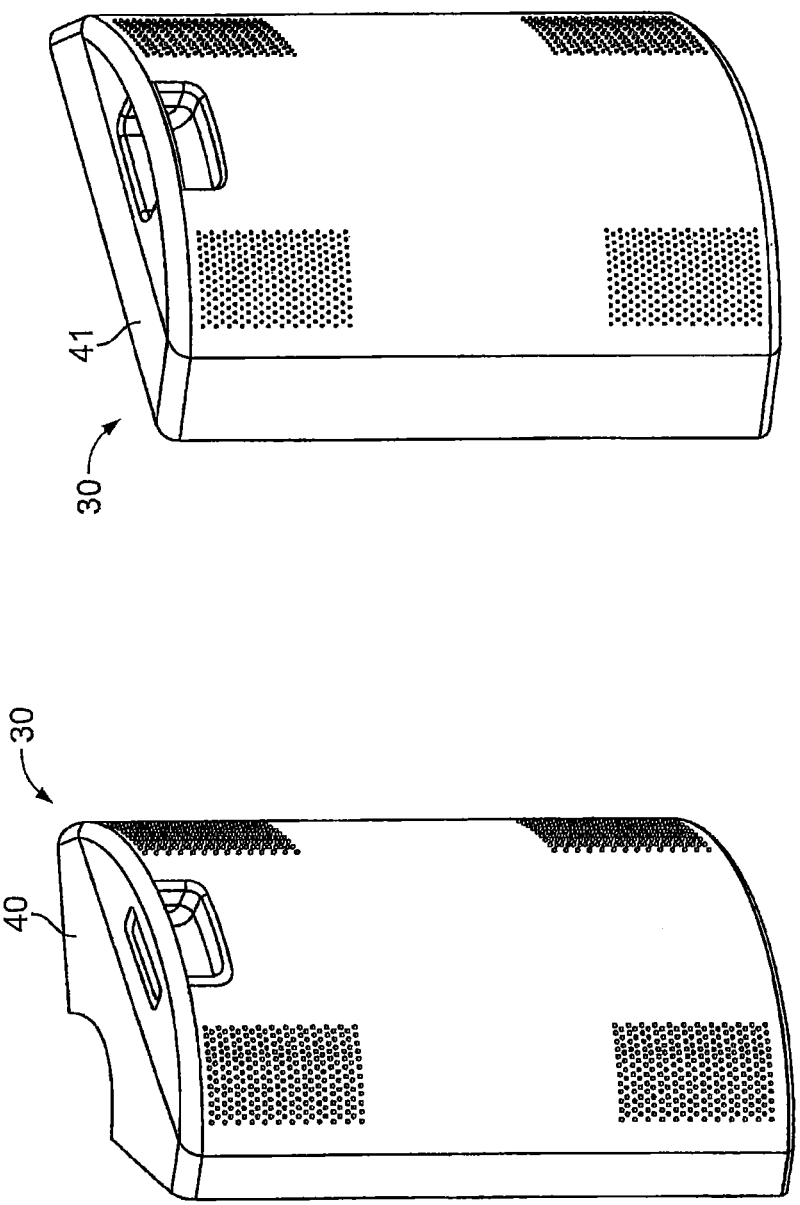

MODULAR SMALL CELL ARCHITECTURE

RELATED APPLICATIONS

The present application is a continuation of U.S. patent application Ser. No 14/316,424 filed Jun. 26, 2014, which claims the benefit of U.S. Provisional Application No. 61/866,764 filed on Aug. 16,2013, the disclosure of which are incorporated by reference in their entireties.

BACKGROUND

As wireless data service demands have grown, a conventional response has been to increase the number and capacity of conventional cellular Base Stations (Macro-Cells). However, Macro Cell sites are becoming less available, and available spectrum limits how much additional capacity can be derived from a given Macro Cell. Accordingly, small cell radios and antenna combinations have been developed to "fill in" underserved or congested areas that would otherwise be within a macro site. Deployment of small cells, particularly in Urban environments is expected to continue to grow.

Currently known small cells integrate an access radio and antenna and a back-haul radio and antenna in a single assembly. Often, heat sink fins are exposed. Such small cell radios may face opposition to installation due to poor aesthetics. Also, they are typically too heavy for a single person to lift, and require lifting machinery (a crane or bucket truck) to install on a pole. Such radios also typically lack a path for sector or carrier growth, have RF "blind spots" caused by a mounting pole, and lack flexibility in back-haul links, or selective provision of additional services. Integrated base station antennas in access radios offer poor RF delivery which can result in reduced capacity handling and higher costs.

CONCISE DESCRIPTION OF THE SEVERAL FIGURES

FIGS. 1(a) and 1(b) show an overview of the Sector Radio Modules of the subject invention.

FIGS. 2(a), 2(b), 2(c) and 2(d) show one embodiment of the module of the subject invention.

Figure 7B:
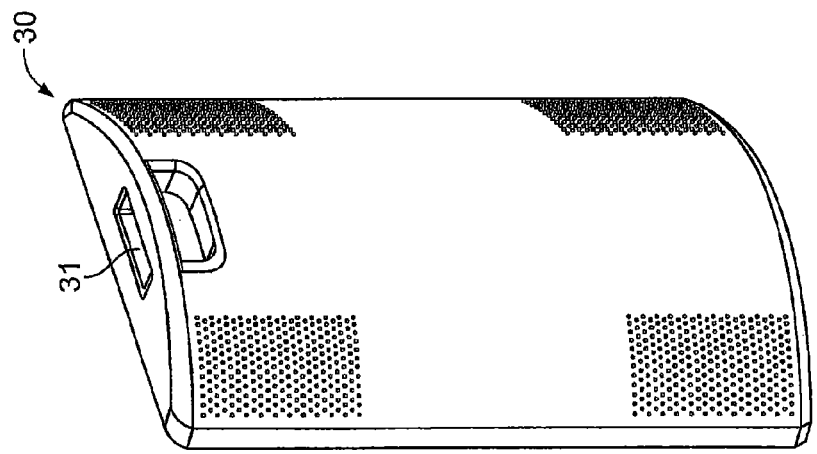
Figure 7A:
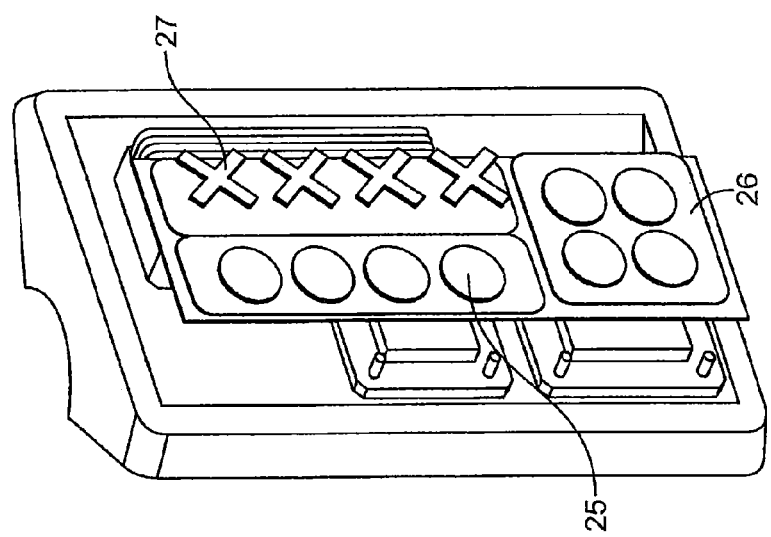

FIGS. 7(a) and 7(b) shows details of the radome cover assemblies.

FIGS. 8(a), 8(b), and 8(c) show details of the radome cover assemblies.

Figure 9B:
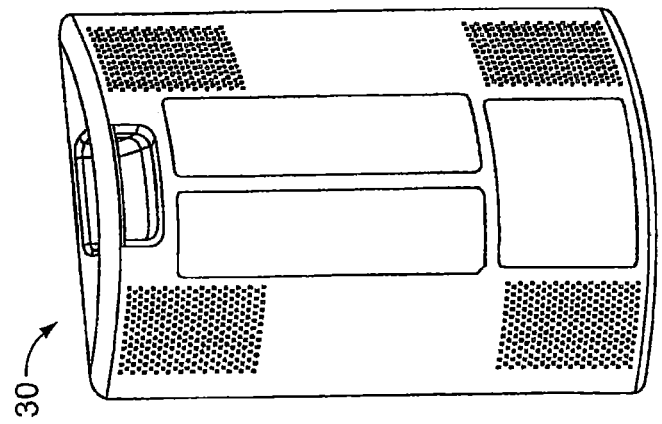
Figure 9A:
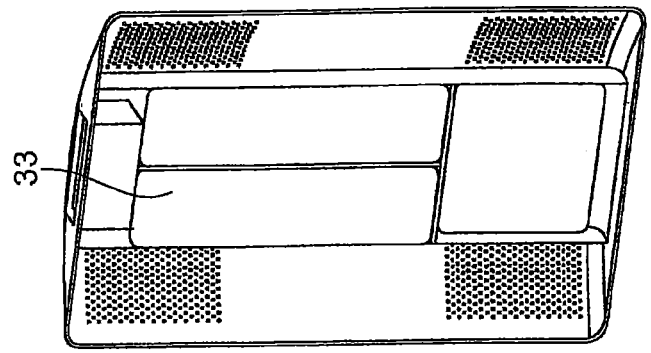

FIGS. 9(a) and 9(b) show details of the radome cover assemblies.

FIGS. 10(a) and 10(b) show the Sector Radio Modular of the subject invention with a mounting bracket.

Figure 11:
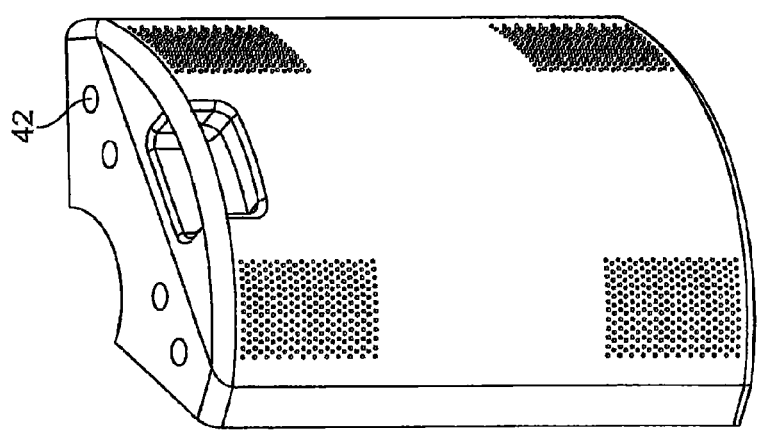

FIG. 11 show knockout ports in the brackets.

Figure 12:
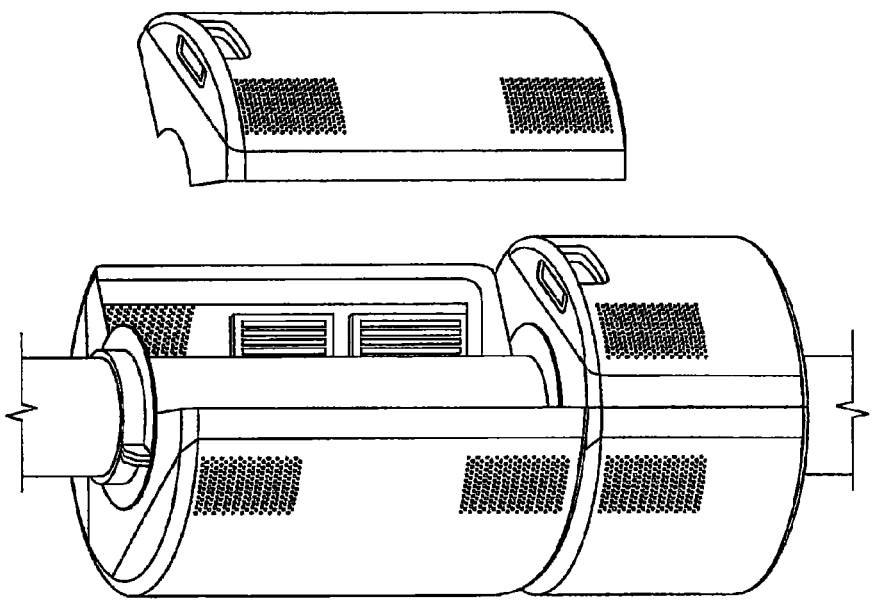

FIG. 12 shows the possible disassembly of a module of the subject invention.

Figure 13:
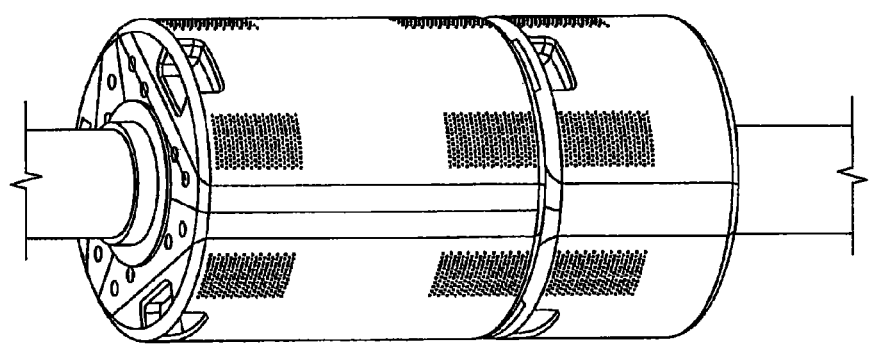

FIG. 13 shows a mobile application of the subject invention.

Figure 14:
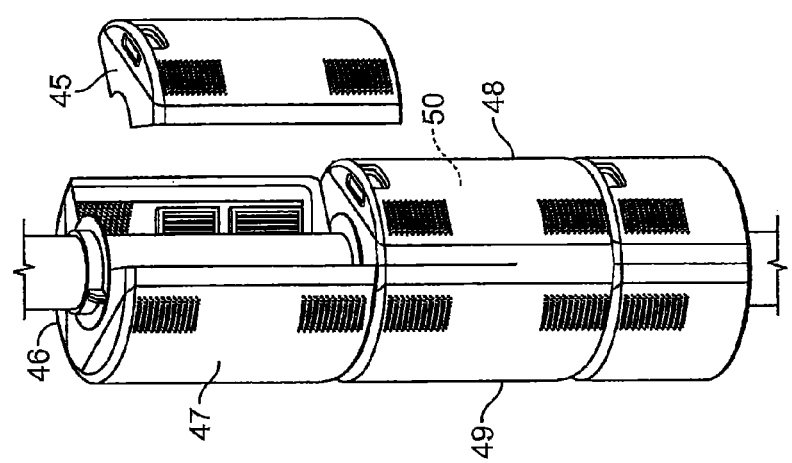

FIG. 14 shows the system of the subject invention having more than one carrier.

DETAILED DESCRIPTION OF THE INVENTION

A modular sectorized small-cell architecture is disclosed herein. The modular architecture includes one or more common modules coupled to one or more sector radio modules. The disclosed architecture results in lightweight modular components that a single service technician can lift and install without lifting machinery. Due to the sectorized designs, there is no RF blind spot. Capacity may be added on an as-needed basis, keeping costs in line with service demands and revenues. Also, back-haul options and additional services may be configured and added in a modular fashion. Finally, the modules have a pleasing aesthetic appearance.

In one example, referring to FIGS. 1 and 2, three Sector Radio Modules 20 and three common 21 modules may be mounted on a pole 22. Each common module typically includes a power supply that converts utility line power to a voltage and current suitable for access radio operation. A common module may also include one or more of an optical data fiber demarcation, a WiFi access point, GPS receiver, and surveillance modules. In the illustrated examples, each common module is shaped as a 120° sector 23 of a cylinder. Additional sectorization schemes are possible, such as 90° sectors or 180° sectors. The common module includes perforations to admit and release cooling air, and may include internal baffles to direct cooling air over active components and/or heat sinks.

Each common module 21 is typically coupled to a Sector Radio Module 20. At a minimum, the common module 21 provides power to the Sector Radio Module 20. The common module 21 may also provide a back-haul link to the Sector Radio Module 20 via the optical fiber demarcation.

The Sector Radio Modules 20 each include an access radio and antenna. In the illustrated examples, the Sector Radio Modules 20 are shaped as a 120° sector of a cylinder. The access radio 24 and antenna are configured, for example, to communicate with mobile handsets and other wireless data devices. In the illustrated example, the access radio antenna is configured to have a half power beam width of approximately 65°. This allows each of the three illustrated Sector Radio Modules to serve a 120° sector, providing a three-sector small cell site. None of the three sectors are occluded by the mounting pole. A set of Base Station modules separate to the radio modules may be located at a higher point on the pole to offer improved RF coverage if required. These may be contained in a separate set of modules OR be attached to a stand-off bracket which will include an internal coax jumper cable, fixing point for the antenna and fixing point to the pole.

The Sector Radio Modules 20 also may include a low capacity back-haul radio and antenna 25, and/or a high capacity back-haul and antenna. In one example, a Sector Radio Module 20 may be equipped with a low capacity back-haul antenna 27 and radio to establish a back-haul link with another small cell site, such as another Sector Radio Module. In another example, Sector Radio Module 20 may be equipped with a low capacity back-haul antenna and radio to receive back-haul data from another small cell site, and a high capacity back-haul antenna 26 and radio to establish a back-haul link with a macro cell site or other back-haul link. In other examples, a Sector Radio Module having only a high capacity back-haul antenna and radio, and a Sector Radio Module having no back-haul radio or antenna may be installed. In the last example, back-haul may be established through the optical fiber demarcation in the common module or another Sector Radio Module mounted on the pole.

There are several features incorporated into the radome cover assemblies for the Sector Radio Modules. Some or all of these features may also be incorporated in the radomes/covers for the common modules.

Figure 3:
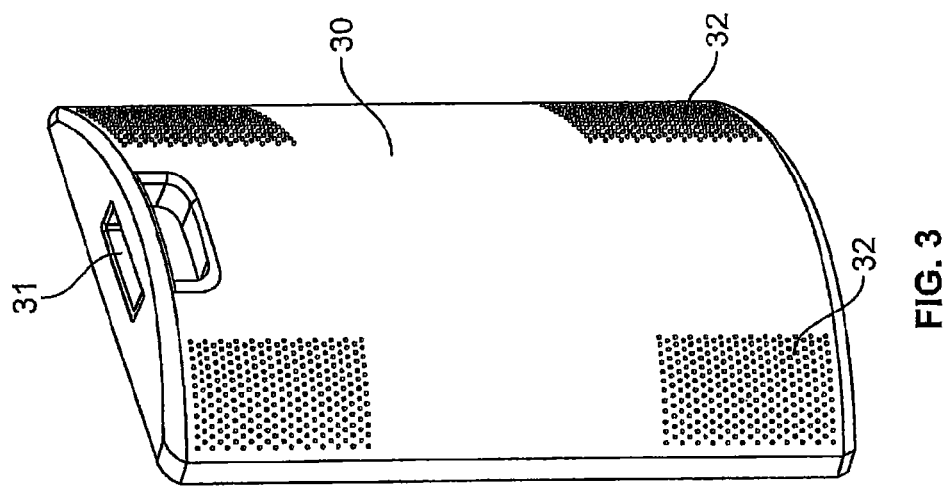
FIG. 3 shows a radome cover of the subject invention.

For example, referring to FIG. 3, the radome cover assembly may comprise a lightweight molded plastic cover. The radome cover assembly 30 may further include a molded-in handle 31 for lifting and installation, tuned dielectric properties, and a radio cooling system 32.

Figure 4:
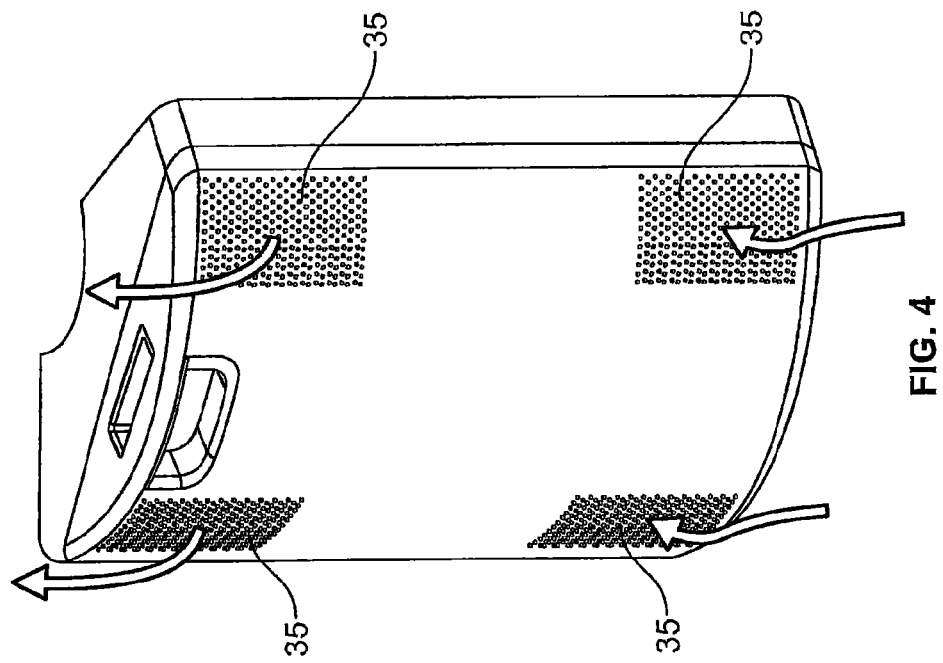
FIGS. 4-6 shows different aspects of the radio cooling system of the subject invention.
Figure 6:
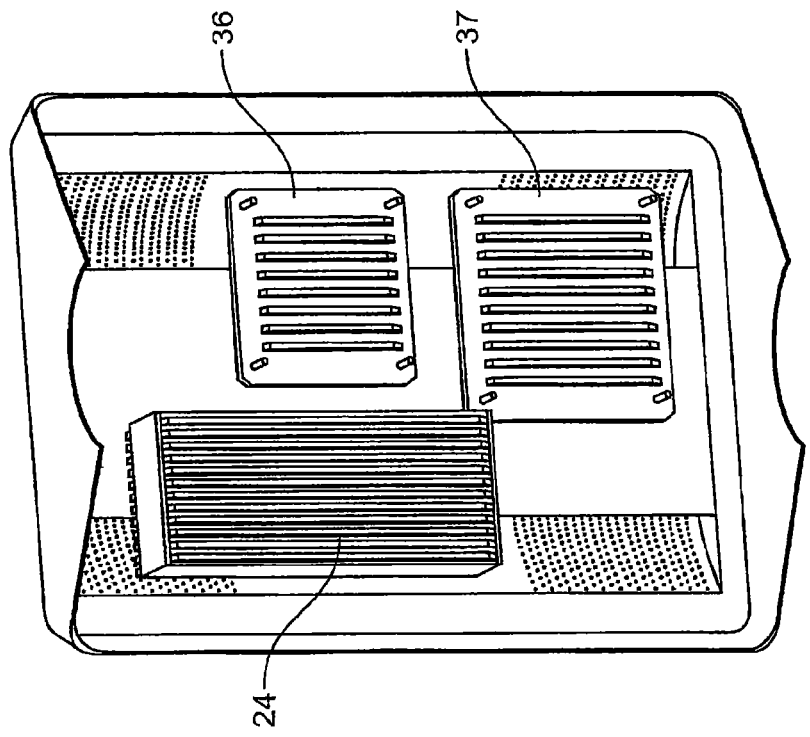
Figure 5:
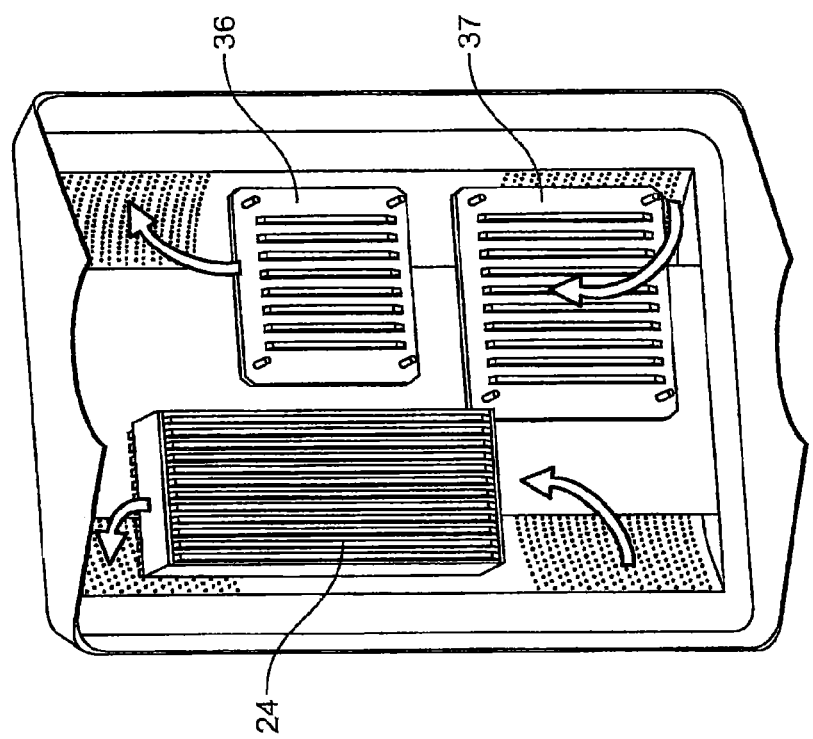

Additional details of the radio cooling system are illustrated in FIGS. 4-6. FIG. 4 illustrates perforations 35 allowing the intake of cooling air and exhaust of hot air. FIG. 5 illustrates the placement of active electronics, such as the access radio 24 and back-haul radios 36, 37, such that cooling air is directed over heatsink fins. The Sector Radio Module may include ducts and baffling to direct cooling air over the heat sinks. FIGS. 5 and 6 also illustrate that the assembly may be configured to provide mounting locations for access and back-haul radios 36, 37, including radios from different manufacturers.

FIGS. 7(a) and 7(b), 8a-8c and 9a-9b illustrate additional details of the tuned dielectric properties of the radome cover assemblies. FIGS. 7(a) and 7(b) illustrate the radome 30 separated from a Sector Radio Module 20, revealing the access antenna assembly 27, the high capacity back-haul antenna 26, and the low capacity back-haul antenna 25. FIG. 8a illustrates a radome cover assembly 30. FIG. 8b illustrates a radome cover assembly 30 with an environmental shield 34 removed, allowing tuned dielectric inserts 33 to be viewed. A first dielectric insert may be tuned to the frequency band of an access antenna, a second dielectric insert is tuned to a frequency band of a low capacity back-haul antenna, and a third dielectric insert may be tuned to a frequency band of the high capacity back-haul antenna. FIG. 8c illustrates how the dielectric inserts are located with respect to the radome cover assembly 30. Access radios may have frequency bands in the 800 MHz to 2.5 GHz range. Back-haul radios may generate at up to 80 GHz. Additional views are provided in FIGS. 9a and 9b. The foregoing allows the dielectric properties of the radome to be matched to any given antenna which may be installed within the Sector Radio Module 20.

FIGS. 10a and 10b illustrate another aspect of the modulating of the present system, instead of a 120° sector of a cylinder (preferred for three-sector applications), the Sector Radio Module may be configured with a wall mount bracket 40, 41.

FIG. 11a illustrate that knockout ports 42 may be included in the brackets to facilitate expansion and/or adding extended antennas. FIG. 12, illustrates the capability to add or remove a single Sector Radio Module without disrupting operation of other Sector Radio Modules. FIG. 13 illustrates a mobile application where a three-sector system may be installed on a pneumatic mast.

Another benefit of the modularity of the disclosed system is illustrated in FIG. 14. In this embodiment, there are three common modules, three Sector Radio Modules 45, 46, 47 associated with a first carrier, and three Sector Radio Modules 48, 49, 50 associated with a second carrier. The common modules supply power to the Sector Radio Modules of both carriers. Due to the modularity of the design, back-haul may be established by different links for the different carriers. For example, the back-haul for the first carrier may be established via a back-haul radio link, and back-haul for the second carrier may be established via the optical fiber demarcation of the common modules. Alternatively, instead of stacking Sector Radio Modules from different carriers, a single carrier may stack Sector Radio Modules servicing different frequency bands. For example, three 800 MHz Sector Radio Modules may be stacked on top of three 2.5 GHz Sector Radio Modules.

What is claimed is:

1. A wireless communications system comprising:
   a common module including a power supply that converts utility power to a voltage and current suitable to power access radio operation, wherein the common module is shaped as a sector of a cylinder and configured to be mounted on an exterior of an antenna mounting pole with the common module spaced apart from a base of the antenna mounting pole; and
   a sector radio module coupled to and powered by the power supply of the common module, the sector radio module comprising a housing and including an access radio and an access antenna in the housing, wherein the access antenna is configured to serve a sector of not more than 180°, wherein the housing of the sector radio module is shaped as a sector of a cylinder and configured to be mounted adjacent the common module on the exterior of the antenna mounting pole, and wherein the sector radio module comprises a radome comprising a dielectric portion tuned to a frequency band of the access antenna.

2. The wireless communications system of claim 1 wherein the common module comprises a plurality of common modules and the sector radio module comprises a plurality of sector radio modules, wherein a combination of the plurality of sector radio modules provides 360 degree access radio coverage.

3. The wireless communications system of claim 2 wherein the plurality of sector radio modules comprises three sector radio modules, each sector radio module being shaped as a 120° sector of a cylinder.

4. The wireless communications system of claim 3 wherein the access antenna is configured to have a half power beam width of approximately 65°.

5. The wireless communications system of claim 1 wherein the sector radio module comprises a plurality of sector radio modules coupled to the common module.

6. The wireless communications system of claim 5 wherein the plurality of sector radio modules comprise a first sector radio module associated with a first wireless network operator and a second sector radio module associated with a second wireless network operator and mounted adjacent the first sector radio module on the antenna mounting pole.

7. The wireless communications system of claim 1 wherein the sector radio module comprises a radome comprising a lightweight molded plastic cover having perforations allowing intake of cooling air such that the cooling air is directed onto heat sinks of the access radio.

8. A wireless communications system comprising:
   a common module including a power supply that converts utility power to a voltage and current suitable to power access radio operation, wherein the common module is shaped as a sector of a cylinder and configured to be mounted on an exterior of an antenna mounting pole with the common module spaced apart from a base of the antenna mounting pole; and
   a sector radio module coupled to and powered by the power supply of the common module, the sector radio module comprising a housing and including an access radio and an access antenna in the housing, wherein the access antenna is configured to serve a sector of not more than 180°, wherein the housing of the sector radio module is shaped as a sector of a cylinder and configured to be mounted adjacent the common module on the exterior of the
antenna mounting pole, and wherein the sector radio module comprises a radome comprising a handle for lifting and/or installation.

9. The wireless communications system of claim 1 wherein the common module comprises a concave recess at a rear portion thereof that is sized and configured to receive the antenna mounting pole.

10. The wireless communications system of claim 1 wherein the sector radio module comprises a concave recess at a rear portion thereof that is sized and configured to receive the antenna mounting pole.

11. The wireless communications system of claim 1 comprising three common modules, three sector radio modules associated with a first network operator, and three sector radio modules associated with a second network operator, wherein the common modules supply power to the sector radio modules of both network operators.

12. The wireless communications system of claim 1 wherein the common module is configured to be selectively mounted on the exterior of the antenna mounting pole at a plurality of different heights.

13. The wireless communications system of claim 1 wherein the common module is configured to be mounted directly beneath the sector radio module on the exterior of the antenna mounting pole.

14. The wireless communication system of claim 1, wherein the common module comprises a housing, wherein the power supply is within the housing.

15. The wireless communication system of claim 14, wherein the common module being shaped as a sector of a cylinder comprises the housing being shaped as the sector of the cylinder.

16. A wireless communications system comprising:
an antenna mounting pole;
a common module including a power supply that converts utility power to a voltage and current suitable to power access radio operation; and
a sector radio module coupled to and powered by the power supply of the common module, the sector radio module including a housing, an access radio, and an access antenna, the access radio and the access antenna arranged within the housing, the access antenna being configured to serve a sector of not more than 180°;
wherein: the housing of the sector radio module is shaped as a sector of a cylinder and is mounted on an exterior of the antenna mounting pole;
the common module is shaped as a sector of a cylinder and is mounted directly beneath the sector radio module on the exterior of the antenna mounting pole; and
the sector radio module comprises a radome comprising a dielectric portion tuned to a frequency band of the access antenna.

17. The wireless communication system of claim 16, wherein the common module comprises a housing, wherein the power supply is within the housing, and wherein the housing of the common module is spaced apart from a base of the antenna mounting pole.

* * * * *